US012577903B2

(12) United States Patent
Emig et al.

(10) Patent No.: US 12,577,903 B2
(45) Date of Patent: Mar. 17, 2026

(54) METHOD FOR DETECTING SLIP IN A BELT DRIVEN INTEGRATED STARTER SYSTEM

(71) Applicant: Ford Global Technologies, LLC, Dearborn, MI (US)

(72) Inventors: Tobias Emig, Gelsenkirchen (DE); Ke Fan, Würselen (DE); Tianyuan Zhou, Beijing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/891,298

(22) Filed: Sep. 20, 2024

(65) Prior Publication Data

US 2025/0092820 A1 Mar. 20, 2025

(30) Foreign Application Priority Data

Sep. 20, 2023 (DE) ........................ 102023125454.5

(51) Int. Cl.
*F02B 77/08* (2006.01)

(52) U.S. Cl.
CPC .................................. *F02B 77/081* (2013.01)

(58) Field of Classification Search
CPC ........ F02B 77/081; F02B 67/06; F02N 11/04; F02N 11/10; F02N 11/108; F02N 15/08; F02N 15/02; F02N 2200/041
See application file for complete search history.

(56) References Cited

U.S. PATENT DOCUMENTS

| | | | | | |
|---|---|---|---|---|---|
| 4,478,595 | A * | 10/1984 | Hayakawa | F16H 7/1263 | 474/110 |
| 4,701,852 | A * | 10/1987 | Ulveland | B60R 16/0236 | 340/439 |
| 5,144,220 | A * | 9/1992 | Iwatani | H02J 7/1446 | 322/73 |
| 6,029,512 | A * | 2/2000 | Suganuma | G01M 13/023 | 322/29 |
| 6,834,228 | B2 * | 12/2004 | Serkh | F02B 67/06 | 123/195 A |
| 7,102,246 | B2 * | 9/2006 | Scherrbacher | F02B 67/06 | 290/40 R |
| 7,322,331 | B2 * | 1/2008 | Tamagawa | F02N 11/08 | 123/179.3 |
| 7,553,256 | B2 * | 6/2009 | Kim | F16H 61/66259 | 477/49 |

(Continued)

FOREIGN PATENT DOCUMENTS

| | | |
|---|---|---|
| DE | 102007008858 | 8/2007 |
| JP | 2001165019 | 6/2001 |

*Primary Examiner* — Henry Y Liu
(74) *Attorney, Agent, or Firm* — Burris Law, PLLC

(57) ABSTRACT

A method for detecting belt slip in a starter system for starting an internal combustion engine of a motor vehicle, the starter system including a belt-driven integrated starter generator. A control unit of the motor vehicle evaluates a belt slip as detected if a determined belt slip value exceeds a limit value. The belt slip value is determined to belong to a defined time window T, which opens after a start of the internal combustion engine. This determination takes into account at least one change in velocity over time value of the starter generator within the time window T. A motor vehicle with a control unit designed to carry out the method is also included.

20 Claims, 5 Drawing Sheets

(56) References Cited

U.S. PATENT DOCUMENTS

| | | | | |
|---|---|---|---|---|
| 8,215,282 | B2 * | 7/2012 | McDonald | B60W 10/30 290/40 C |
| 8,914,190 | B2 * | 12/2014 | Detrois | F16H 7/1281 701/1 |
| 9,464,697 | B2 * | 10/2016 | Antchak | F16H 7/12 |
| 9,739,347 | B2 * | 8/2017 | Petridis | F02N 19/00 |
| 9,863,310 | B2 * | 1/2018 | Pendovski | F16H 7/08 |
| 10,879,827 | B2 * | 12/2020 | Chung | B60K 6/26 |
| 11,054,028 | B2 * | 7/2021 | Matsui | F16H 61/66259 |
| 11,220,956 | B2 * | 1/2022 | Heckel | F02B 63/042 |
| 2003/0155772 | A1 * | 8/2003 | Scherrbacher | F02N 11/04 73/114.62 |
| 2005/0263121 | A1 * | 12/2005 | Tamagawa | F02N 11/0814 123/179.3 |
| 2007/0060441 | A1 * | 3/2007 | Kim | F16H 61/66254 477/45 |
| 2010/0228450 | A1 * | 9/2010 | Takahashi | F16H 61/143 701/51 |
| 2012/0065009 | A1 * | 3/2012 | Mueller | F02B 67/06 474/101 |
| 2012/0259510 | A1 * | 10/2012 | Detrois | F16H 7/1281 474/101 |
| 2013/0172137 | A1 * | 7/2013 | Antchak | B60K 25/02 474/133 |
| 2014/0130635 | A1 * | 5/2014 | Kees | F02N 15/08 474/101 |
| 2014/0149024 | A1 * | 5/2014 | Kim | F16H 7/00 701/113 |
| 2014/0309882 | A1 * | 10/2014 | Antchak | F02B 67/06 474/104 |
| 2015/0260264 | A1 * | 9/2015 | Petridis | F16H 7/08 474/101 |
| 2016/0007526 | A1 * | 1/2016 | Greulich | F16H 7/1281 56/14.7 |
| 2016/0363046 | A1 * | 12/2016 | Pendovski | F16H 7/08 |
| 2019/0348939 | A1 * | 11/2019 | Chung | H03H 21/0043 |
| 2019/0376483 | A1 * | 12/2019 | Khafagy | F02N 15/06 |
| 2020/0056536 | A1 * | 2/2020 | Heckel | F02B 67/06 |
| 2020/0240516 | A1 * | 7/2020 | Matsui | F16H 61/66272 |

* cited by examiner

METHOD FOR DETECTING SLIP IN A BELT DRIVEN INTEGRATED STARTER SYSTEM

CROSS-REFERENCE TO RELATED APPLICATION

This application claims priority to and the benefit of German Patent Application No. 102023125454.5, filed on Sep. 20, 2023. The disclosure of the above application is incorporated herein by reference.

FIELD

The present disclosure relates a method for detecting belt slip in a starter system for starting an internal combustion engine of a motor vehicle.

BACKGROUND

The statements in this section merely provide background information related to the present disclosure and may not constitute prior art.

In hybrid systems of motor vehicles, the internal combustion engine is often started with a belt-driven belt integrated starter generator (BISG) connected to the front-end accessory drive (FEAD) via a belt as a starting device for automatic stop-start operation. In addition, the BISG is also used during engine operation to recuperate energy and support the internal combustion engine (ICE) with the torque from the recuperated energy to increase fuel economy. On the one hand, the belt tension should be kept low in order to reduce parasitic friction loss. On the other hand, the belt tension should be high enough to provide robust FEAD load transfer.

For this reason, for example, an active two-stage tensioner is used to adjust the belt tension, which can switch between low and high belt tension. During the engine start-up phase, when the torque transmitted through the FEAD is very high, the tensioner is controlled to switch to the high belt pre-tensioning position. While the engine is running, the tensioner remains in the low belt tension position to increase fuel economy, and only shifts to the high belt tension position when the requested BISG torque exceeds a certain threshold value.

However, slip can occur in the FEAD both when starting and operating the engine, which reduces fuel efficiency, and increases belt wear and NVH levels.

Belt slip occurs whenever the friction between the belt and the individual belt pulleys of the FEAD is not sufficient to transfer the desired torque from one belt pulley to the other, i.e. in this case from the BISG to the crankshaft pulley of the internal combustion engine or vice versa. This can be caused, for example, by an incorrectly adjusted belt tensioner, belt wear, elongation of the belt, contamination of the belt with fluids or materials that reduce the coefficient of friction (CoF) between the belt surface and the belt pulley surface, etc. These causes can be temporary, i.e., the belt slips when the belt is wet, for example, and after the water evaporates the belt works as intended again, or they are permanent, for example when the belt is worn out.

Detecting belt slip during these events enables initiation of countermeasures to protect against unwanted noise (NVH) and excessive wear, and to inform the operator and/or bring the system to a preferred state.

Well-known solutions have some drawbacks. For example, DE 10 2007 008 858 A1 provides a method in which a comparison is made between the crankshaft speed and the BISG machine speed when the engine is started in order to detect belt slip. However, this involves a data bus system that delivers a data stream with a high repetition rate and high-resolution measurement. As an alternative solution, the belt slip value (BSV) can be calculated from the BISG velocity change per unit time based on the BISG speed and the BISG internal resistance (based on measured current and voltage). However, depending on the internal control logic of the BISG and the power supply system, the BISG internal resistance may not exhibit such behavior during start-up slip as described in DE 10 2007 008 858 A1.

SUMMARY

This section provides a general summary of the disclosure and is not a comprehensive disclosure of its full scope or all of its features.

The present disclosure provides a method for detecting belt slip in a starter system with a belt-driven integrated starter generator.

A method for detecting belt slip in a starter system for starting an internal combustion engine of a motor vehicle is revealed, wherein the starter system has a belt-driven integrated starter generator, wherein according to the disclosure a control unit of the motor vehicle evaluates a belt slip as detected if a determined belt slip value exceeds a limit value, wherein the belt slip value is determined to belong to a defined time window T, which opens after a start of the internal combustion engine, and this determination takes into account at least one change in velocity over time value of the starter generator within the time window T.

It should be noted that the features and measures mentioned individually in the following description can be combined with each other in any technically feasible way and reveal further forms of the disclosure. The description additionally characterizes and specifies the disclosure, especially in connection with the figures.

The method according to the disclosure is used to detect belt slip in a starter system for starting an internal combustion engine of a motor vehicle, wherein the starter system has a belt-driven integrated starter generator. The motor vehicle is typically a so-called mild hybrid vehicle, in which at least one electric motor supports the operation of the internal combustion engine. It is, in one form, a motor vehicle with a P0 mild hybrid system with a BISG (Belt Integrated Starter Generator). The letter P indicates the position of the electric motor in the mild hybrid system, wherein in a P0 hybrid system the electric motor is connected to the internal combustion engine.

The disclosure includes that a control unit of the motor vehicle evaluates a belt slip as detected if a determined belt slip value exceeds a limit value, wherein the belt slip value is determined to belong to a defined time window T, which opens after a start of the internal combustion engine, and this determination takes into account at least one change in velocity over time value of the starter generator within the time window T.

The method according to the disclosure for the detection of belt slip in such a starter system with BISG is therefore based on the consideration of a BISG change in velocity over time value. Slip when starting the engine leads to a strong overshoot of the BISG change in velocity over time value. However, due to disturbance factors, such as engine speed fluctuations due to pumping and ignition processes, the occurrence of belt slip cannot be reliably determined with a simple, statically calibrated BISG change in velocity over time value. It is therefore advantageous for the control unit to evaluate several samples of the BISG change in velocity over time values within a certain time window T during engine start-up. Taking into account at least one change in velocity over time value has the advantage that an overshoot of the BISG change in velocity over time is always an indication of slip. Setting a time window T after starting has the advantage that higher BISG change in velocities over time that could be caused by combustion in the engine are not taken into account.

In one form of the present disclosure, the method provides that a time window T for slip detection is first specified after the internal combustion engine has been started. Then the control unit repeatedly performs at least the following steps until a determined belt slip value exceeds a limit value or the time window T is exceeded:

- determination of a change in velocity over time value of the starter generator;
- determination of a slip number assigned to the respective determined change in velocity over time value;
- adding up the slip numbers determined so far to a resulting belt slip value; and
- comparison of the belt slip value with the limit value.

A change in velocity over time value of the starter generator is determined, for example, by measuring a first speed value RPM_a within the time window T and measuring a second speed value RPM_b after a defined sampling time interval Ti_Sample has elapsed, wherein the change in velocity over time value of the starter generator is calculated by (RPM_a−RPM_b)/Ti_Sample. The speed values RPM_a and RPM_b are measured, for example, on the basis of the shaft speed of the starter generator.

It is, in one form, provided that the assignment between a respective change in velocity over time value of the starter generator and a slip number is stored in the control unit or can be retrieved by the control unit from another data source. In particular, the slip number is an incremental value.

In one form of the present disclosure, the time window T is defined by a period of time between the beginning of starting the engine and before the ignition of the engine. The end of the time window T can be determined on the basis of the feedback of an engine ignition signal or a calibrated duration based on the engine stop position.

It has proven to be advantageous if the control unit initiates countermeasures if the cumulative belt slip number exceeds the specified limit value. The countermeasures may include, for example, reducing the BISG torque, interrupting the starting process and/or using a conventional starter motor for cranking up. The disclosure can therefore be used advantageously to inhibit unwanted noise (NVH) and to inhibit excessive wear of the belt.

The disclosure also includes a motor vehicle having a starter system for starting an internal combustion engine of the motor vehicle with a belt-driven integrated starter generator and a control unit designed to carry out a method for detecting belt slip according to one form of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

Further advantageous forms of the disclosure are disclosed in the dependent claims and the following description of the figures. In the figures FIG. 1 shows a schematic representation of the integration of a BISG into a starter system for an internal combustion engine according to one form of the present disclosure;

Figure 1:
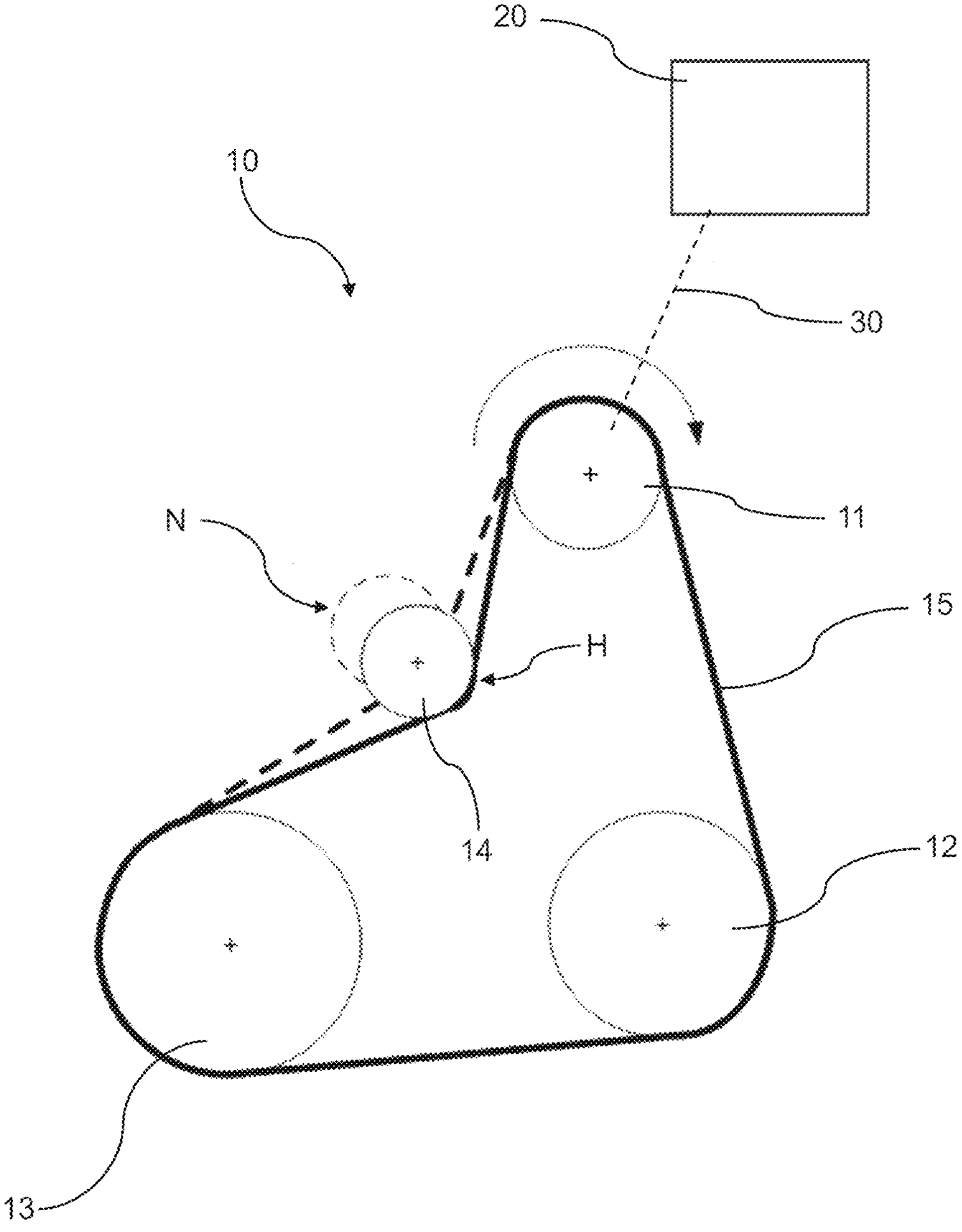

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the different figures, the same parts are always provided with the same reference signs, which is why they are usually only described once.

FIG. 1 schematically shows a starter system 10 for a mild hybrid system of a motor vehicle, which is connected to an internal combustion engine or FEAD (not shown) via a crankshaft-belt pulley 13. The starter system 10 has a belt-driven belt integrated starter generator (BISG) 11 with a belt 15. The belt-driven integrated starter generator 11 is hereinafter referred to as the BISG 11. The BISG 11 is also, in one form, used during engine operation to recuperate energy and support the internal combustion engine with the torque from the recuperated energy. Thus, a belt pulley 12 is also shown as an example, and the belt 15 is fed around the crankshaft belt pulley 13 and the belt pully 12 of the BISG 11, the crankshaft belt pulley 13 and the belt pulley 12. An active tensioner 14, which can, for example, switch between a position with high belt tension H and a position with low belt tension N, is provided for adjusting the belt tension.

During the starting phase of the engine, when the torque transmitted via the FEAD is very high, the tensioner 14 is controlled in such a way that it shifts to the h position with high pre-tensioning. While the engine is running, the tensioner 14 will remain in the low-tension position N to increase fuel economy, and will only shift to the high-tension position if the requested BISG torque is above a certain threshold value. The switching is carried out by a control unit 20 of the motor vehicle, which is also designed to carry out the method of detecting belt slip in the starter system 10 according to the disclosure. Such a control unit 20 is schematically shown in FIG. 1, wherein the communication link 30 of the control unit 20 at least to the BISG 11 or the shaft thereof is indicated in dashed form. The control unit 20 is typically formed by a large number of interconnected individual components, which are shown here as one control unit 20 for the sake of simplification. Furthermore, there may be other communication links to the crankshaft-belt pulley 13 of the crankshaft, to the belt pulley 12, etc., which are not shown here.

Figures 2A, 2B:
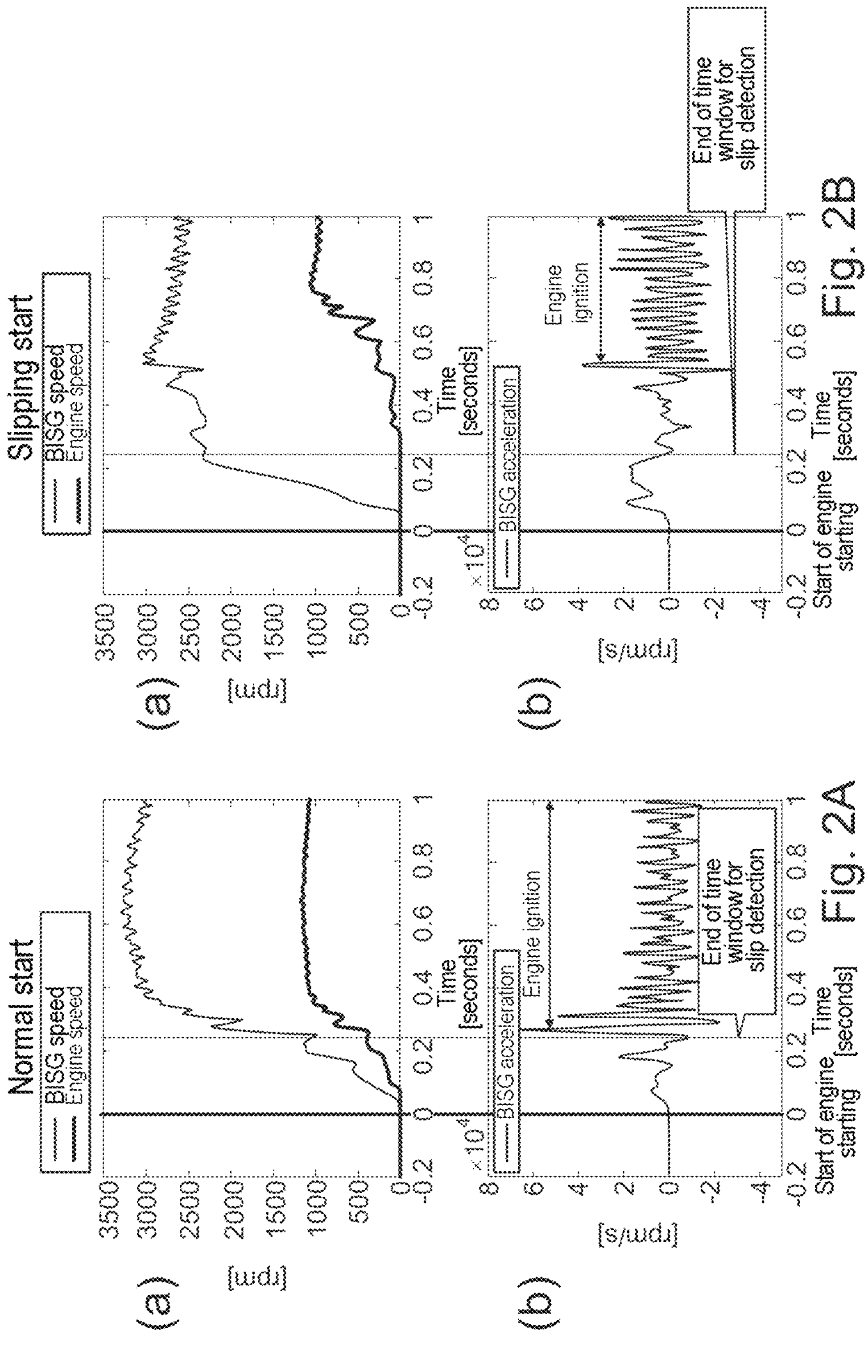
FIG. 2A shows (a) a graph of the speed of the internal combustion engine and BISG during a normal start (rpm against time); and (b) a graph of the change in velocity over time of the BISG during a normal start (rpm/s against time) according to one form of the present disclosure.
FIG. 2B shows (a) a diagram of the speed of the internal combustion engine and BISG during a slipping start (rpm against time); and (b) a graph of the change in velocity of the BISG during a slipping start (rpm/s against time) according to one form of the present disclosure.

The disclosure provides that the control unit 20 evaluates a plurality of samples of the BISG change in velocity over time value within a certain time window T during engine start-up. Therefore, a suitable time window for slip detection must first be determined. From the graphs of FIGS. 2A and 2B, it can be seen that the slipping start in the initial phase of starting an engine produces a higher BISG change in velocity over time than the normal start. However, after the engine ignition starts, combustion in the engine could cause even higher BISG change in velocity over time than is caused by belt slip. Therefore, it is desired to define a time window after starting the engine and before ignition of the engine. The end of the time window can be determined based on the feedback of the engine ignition signal or a calibrated duration based on the engine stop position. BISG change in velocities over time within this time window T are valid for slip detection and are collected for further calculations. For example, the duration of a time window is 0.2 to 0.3 seconds.

In one form, a BISG change in velocity over time is calculated by the control unit 20 by measuring the BISG shaft speed twice in a row in time to obtain the values RPM_a and RPM_b. The speed can be measured, for example, with a speed sensor mounted on the BISG shaft or with a sensor-less speed measurement method based on a motor current analysis, wherein these values are transmitted to the control unit 20.

Figure 3:
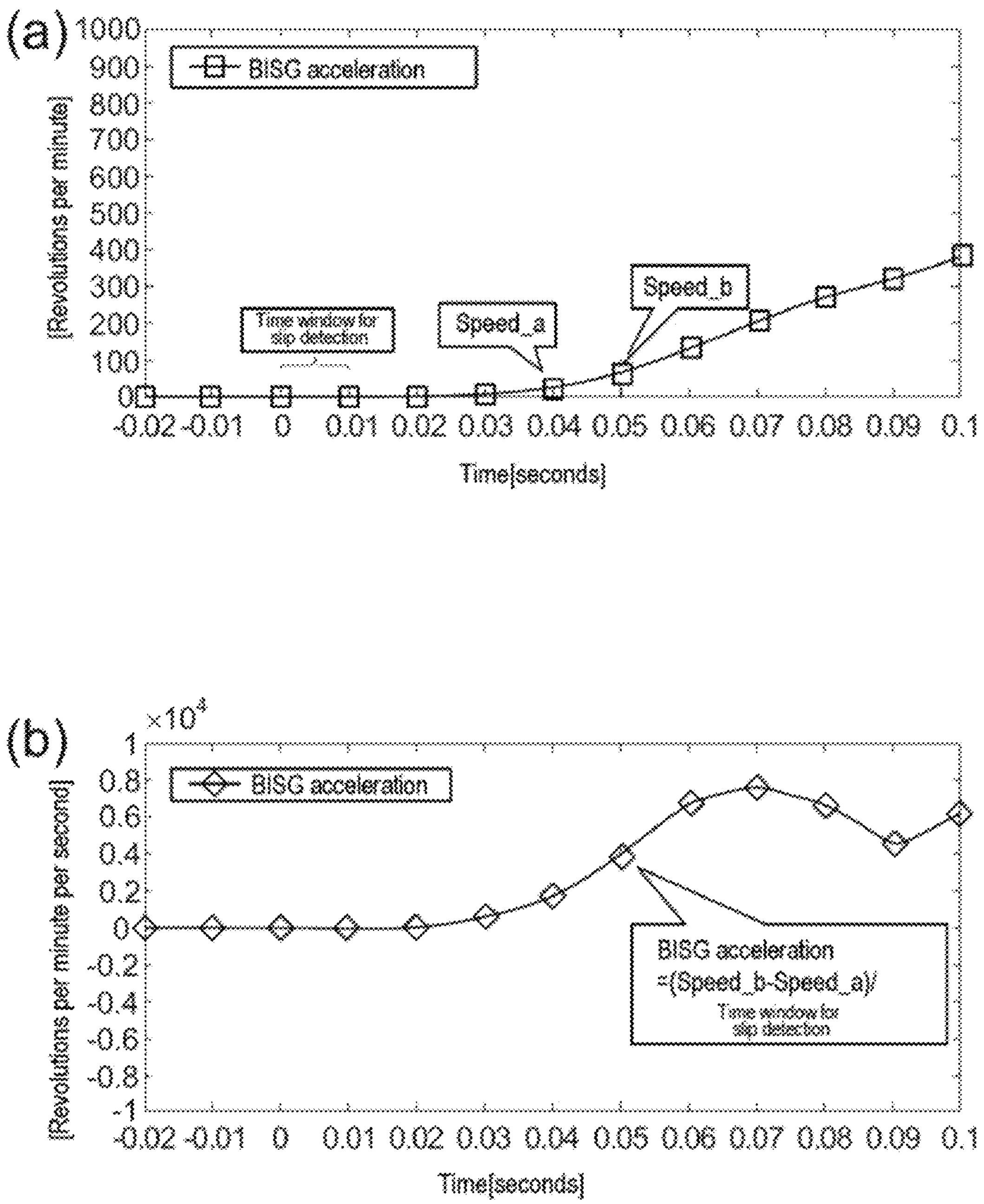
FIG. 3 shows (a) a graph of speed values of the BISG (rpm against time); and (b) a graph of the change in velocity over time of the BISG (rpm/s against time) with the sampling interval Ti_sample according to one form of the present disclosure.

Then RPM_b is subtracted from RPM_a and the result is then divided by the sampling time Ti_Sample, i.e. the sampling interval between two measurements, to get the BISG change in velocity over time in the current calculation step. Thus the calculation (RPM_a-RPM_b)/Ti_Sample is carried out. The determination of these values is also shown in the graphs of FIG. 3, wherein FIG. 3 (*a*) shows the measured BISG speed values and FIG. 3 (*b*) shows the calculated BISG change in velocities over time. FIG. 3 shows an example of a sampling interval (Ti_Sample) of 0.01 s duration.

Figure 4:
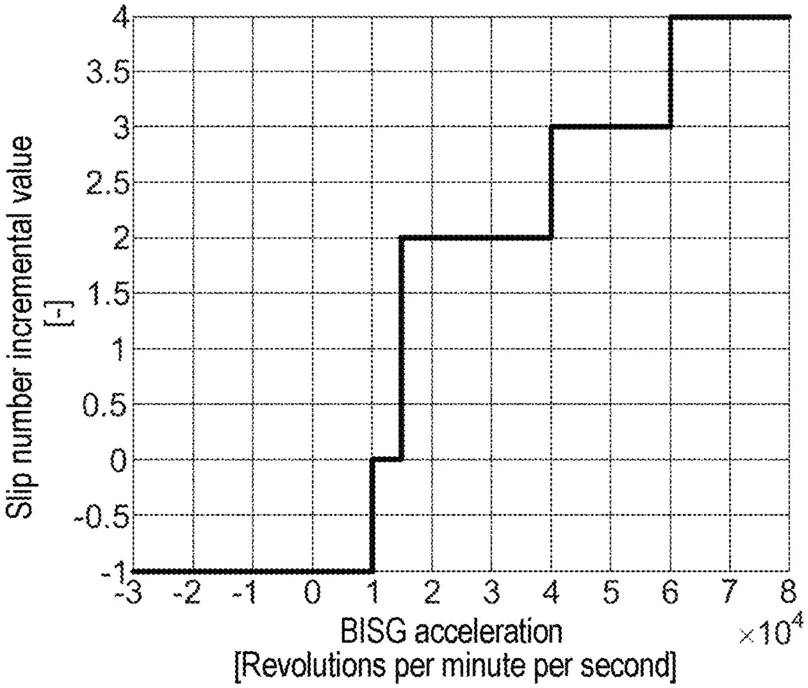
FIG. 4 shows example data of a lookup table for the incremental value of the slip number assigned to change in velocity over time values according to one form of the present disclosure.

Subsequently, the accumulated slip number is calculated based on the BISG change in velocity over time during the specified time window T. For example, an incremental value of the slip number is calculated from a lookup table for each calculation step, wherein the BISG change in velocity over time serves as the input. An example of data of a lookup table for the stepwise incremental value of the slip number is given in FIG. 4.

These steps are carried out repeatedly in the time window T, i.e. one after the other. The slip numbers determined in this way are cumulated at each step to obtain a resulting belt slip value for the time window T. This belt slip value is then compared with a specified limit value, which is used by the control unit 20. This limit value or threshold value can be either static or dynamic. If the belt slip value is above the specified limit value during a certain time window T, the control unit 20 evaluates a too high belt slip as detected.

If such a belt slip is detected, appropriate measures can be taken to inhibit excessive belt slip. This may include, for example, reducing the BISG torque, interrupting the starting process with BISG, and/or using a conventional starter motor for cranking up.

Figure 5:
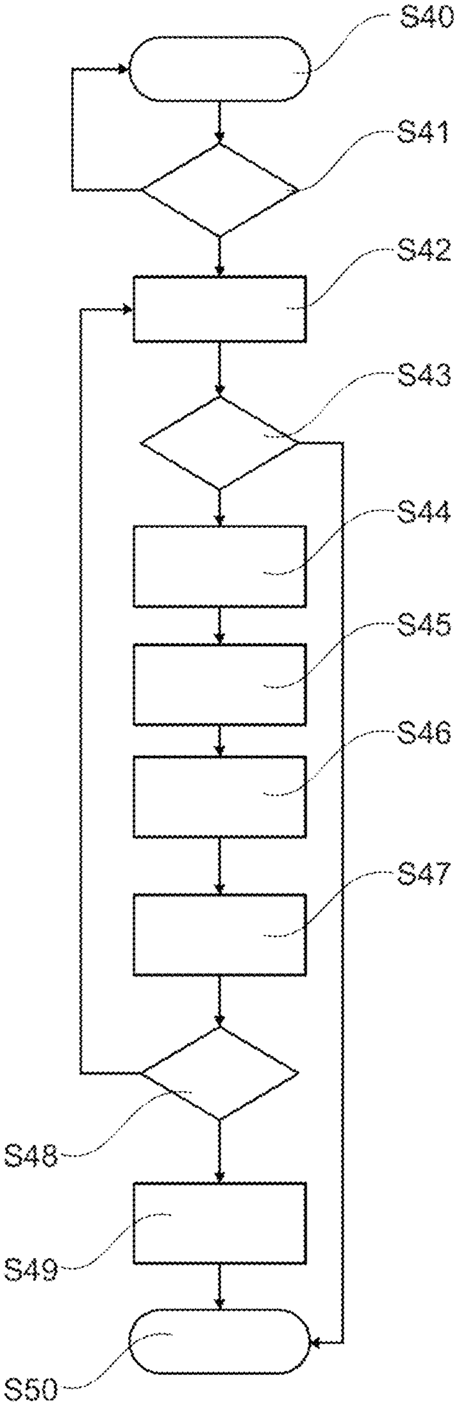
FIG. 5 shows a flow diagram for one form of the method according to the present disclosure for detecting and controlling the belt slip when starting an engine.

FIG. 5 shows a flow diagram for one form of the method according to the disclosure for detecting and controlling the belt slip when starting an engine. The method is carried out by a control unit 20 of a motor vehicle and starts in step S40. It first checks in step S41 whether there is a standard to start the internal combustion engine. Only if this is the case, step S42 determines how much time has elapsed since the start request. If the determined time is outside the time window T for the detection of belt slip in step S43, the method is terminated or canceled in step S50. However, if step S43 determines that the time is still in the time window T, the two BISG speed values RPM_a and RPM_b are measured in succession in step S44. This can be done as described above. In step S45, the BISG change in velocity over time is then calculated using the calculation method (RPM_b−RPM_a)/Ti_Sample, wherein Ti_Sample represents the sampling interval between the two measurements RPM_a and RPM_b. FIG. 3 shows an example of a sampling interval (Ti_Sample) of 0.01 s. The assigned slip number is determined for this BISG change in velocity over time in step S46 and is summed up in step S47, or the first slip number forms the starting point for the summation. The summed slip numbers form the belt slip value, which is compared with a limit value in step S48 (belt slip value>limit value?). The limit can be static or dynamic. If the condition is not yet met, the method goes back to step S42 and checks in step S43 whether the elapsed time is still in the time window T. Then the BISG speeds, BISG change in velocity over time and corresponding slip number are determined again until the comparison in step S48 shows that the belt slip value, i.e. the slip numbers summed up to that point, exceed the limit value. In this case, belt slip is considered detected in step S49 and countermeasures are optionally initiated. In this form, this includes aborting the starting process via BISG and, for example, using a conventional starter motor for cranking up the engine. The method is then terminated in step S50.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for detecting belt slip in a starter system for starting an internal combustion engine of a motor vehicle, the starter system comprising a belt-driven integrated starter generator, the method comprising:

evaluating, via a control unit of the motor vehicle, the belt slip when a determined belt slip value exceeds a limit value, wherein the determined belt slip value is determined to belong to a defined time window T, the defined time window T opening after a start of the internal combustion engine, and the determined belt slip value takes into account at least one change in velocity over time value of the belt-driven integrated starter generator within the defined time window T.

2. The method according to claim 1, wherein the defined time window T is set for slip detection after a start of the internal combustion engine, and the control unit repeats at least the following until a determined belt slip value exceeds a limit value or the time window T is exceeded:

determining the at least one change in velocity over time value of the belt-driven integrated starter generator;

determining a slip number assigned to the respective determined change in velocity over time value;

adding up the slip numbers determined so far to a resulting belt slip value; and comparing the determined belt slip value with the limit value.

3. The method according to claim 2, wherein an assignment between the respective determined change in velocity over time value over time of the belt-driven integrated starter generator and the slip number is stored in the control unit.

4. The method according to claim 3, wherein the slip number is an incremental value.

5. The method according to claim 2, wherein an assignment between the respective determined change in velocity over time value of the belt-driven integrated starter generator and the slip number is configured to be retrieved by the control unit from another data source.

6. The method according to claim 1, wherein the at least one change in velocity over time value of the belt-driven integrated starter generator is determined by measuring a first speed value RPM_a within the defined time window T and measuring a second speed value RPM_b after an expiration of a defined time sampling interval Ti_Sample, wherein the respective determined change in velocity over time value of the belt-driven integrated starter generator is calculated by an equation:

$$(\text{RPM}\_a-\text{RPM}\_b)/Ti\_\text{Sample}.$$

7. The method according to claim 6, wherein the first speed value RPM_a and the second speed value RPM_b are measured based on a shaft speed of the belt-driven integrated starter generator.

8. The method according to claim 1, wherein the defined time window T defines a period of time between a beginning of starting the internal combustion engine and before an ignition of the internal combustion engine.

9. The method according to claim 8, wherein an end of the defined time window T is determined from a feedback of an engine ignition signal.

10. The method according to claim 8, wherein an end of the defined time window T is determined from a calibrated duration based on an engine stop position.

11. The method according to claim 1, wherein the control unit initiates countermeasures if the determined belt slip value exceeds the limit value.

12. A motor vehicle including a starter system for starting an internal combustion engine of the motor vehicle with a belt-driven integrated starter generator and a control unit designed to carry out a method for detecting belt slip according to claim 1.

13. A method for detecting belt slip in a starter system for starting an internal combustion engine of a motor vehicle, the starter system comprising a belt-driven integrated starter generator, the method comprising evaluating, via a control unit of the motor vehicle, a belt slip when a determined belt slip value exceeds a limit value, wherein the determined belt slip value is determined to belong to a defined time window T, the defined time window T opens after a start of the internal combustion engine, and the determined belt slip value takes into account at least one change in velocity over time value of the belt-driven integrated starter generator within the defined time window T, the defined time window T is set for slip detection after a start of the internal combustion engine, and the control unit repeats at least:

determining the at least one change in velocity over time value of the belt-driven integrated starter generator;

determining a slip number assigned to the respective determined change in velocity over time value;

adding up the slip numbers determined so far to a resulting belt slip value; and comparing the determined belt slip value with the limit value until a determined belt slip value exceeds the limit value or the defined time window T is exceeded.

14. The method according to claim 13, wherein the at least one change in velocity over time value of the belt-driven integrated starter generator is determined by measuring a first speed value RPM_a within the defined time window T and measuring a second speed value RPM_b after an expiration of a defined time sampling interval Ti_Sample, wherein the respective determined change in velocity over time value of the belt-driven integrated starter generator is calculated by an equation: (RPM_a−RPM_b)/Ti_Sample.

15. The method according to claim 14, wherein the first speed value RPM_a and the second speed value RPM_b are measured based on a shaft speed of the belt-driven integrated starter generator.

16. The method according to claim 13, wherein an assignment between the respective determined change in velocity over time value of the belt-driven integrated starter generator and the slip number is stored in the control unit.

17. The method according to claim 13, wherein an assignment between the respective determined change in velocity over time value of the belt-driven integrated starter generator and the slip number is configured to be retrieved by the control unit from another data source.

18. The method according to claim 13, wherein the defined time window T defines a period of time between a beginning of starting the internal combustion engine and before an ignition of the internal combustion engine.

19. The method according to claim 13, wherein the control unit initiates countermeasures if the determined belt slip value exceeds the limit value.

20. A method for detecting belt slip in a starter system for starting an internal combustion engine of a motor vehicle, the starter system comprising a belt-driven integrated starter generator, the method comprising evaluating, via a control unit of the motor vehicle, a belt slip when a determined belt slip value exceeds a limit value, wherein the determined belt slip value is determined to belong to a defined time window T, the defined time window T opens after a start of the internal combustion engine, and the determined belt slip value takes into account at least one change in velocity over time value of the belt-driven integrated starter generator within the defined time window T, the defined time window T is set for slip detection after a start of the internal combustion engine, and the control unit repeats at least:

determining the at least one change in velocity over time value of the belt-driven integrated starter generator;

determining a slip number assigned to the respective determined change in velocity over time value;

adding up the slip numbers determined so far to a resulting belt slip value; and comparing the determined belt slip value with the limit value until a determined belt slip value exceeds the limit value or the defined time window T is exceeded, the at least one change in velocity over time value of the belt-driven integrated starter generator is determined by measuring a first speed value RPM_a within the defined time window T and measuring a second speed value RPM_b after an expiration of a defined time sampling interval Ti_Sample, the first speed value RPM_a and the second speed value RPM_b are measured based on a shaft speed of the belt-driven integrated starter generator, wherein the respective determined change in velocity over time value of the belt-driven integrated starter generator is calculated by an equation: (RPM_a−RPM_b)/Ti_Sample.

* * * * *